United States Patent [19]

Conner

[11] 4,075,729
[45] Feb. 28, 1978

[54] LIFTING MECHANISM FOR A PORTABLE DOCKBOARD

[76] Inventor: John R. Conner, 3003 Bluffwood Terrace, St. Joseph, Mich. 49085

[21] Appl. No.: 768,694

[22] Filed: Feb. 14, 1977

[51] Int. Cl.² .............................................. E01D 15/00
[52] U.S. Cl. ....................................................... 14/72.5
[58] Field of Search ................................ 14/72.5, 69.5

[56] References Cited

U.S. PATENT DOCUMENTS

| | | | |
|---|---|---|---|
| 2,597,213 | 5/1952 | Whiteman | 14/72.5 |
| 2,739,325 | 3/1956 | Grace | 14/69.5 |
| 2,880,431 | 4/1959 | Noland | 14/72.5 |
| 3,122,764 | 3/1964 | Ambli | 14/16.5 X |
| 3,233,767 | 2/1966 | Goodacre | 14/72.5 X |
| 3,516,560 | 6/1970 | Brighton | 14/69.5 X |
| 3,802,018 | 4/1974 | Miles | 14/72.5 |

Primary Examiner—Nile C. Byers

[57] ABSTRACT

A device is shown that is adapted to be used with heavy portable dockboards or dockplates to raise a corner or edge thereof so that the forks of a forktruck can be pushed under the dockboard structure that is to be lifted and transported to another location. A leverage system is permanently mounted on one or more corners of the dockboard or the like, the system being operative to easily raise at least one corner of the board high enough to permit the forks of the forktruck to be slid under the board.

7 Claims, 8 Drawing Figures

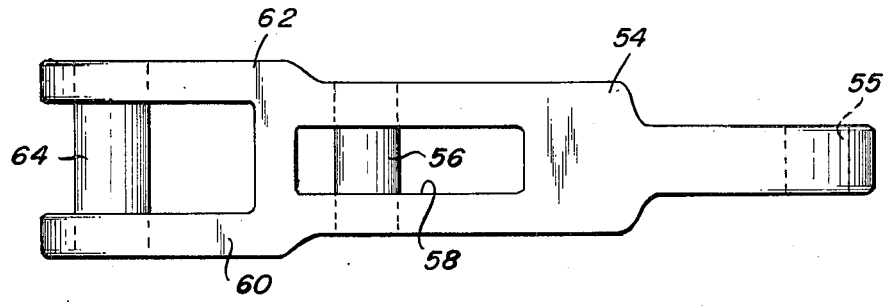
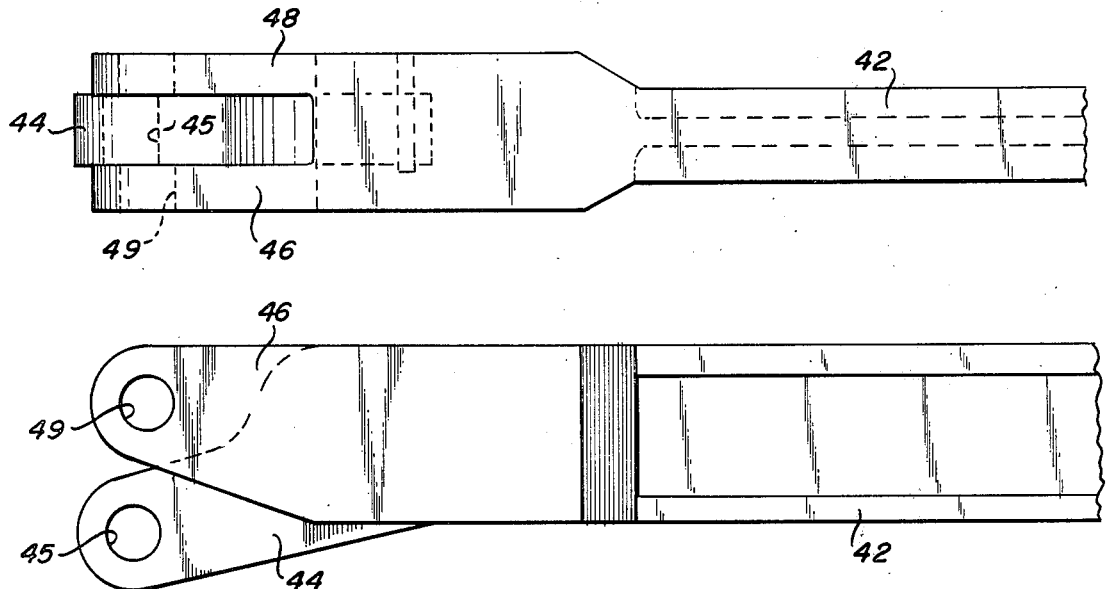
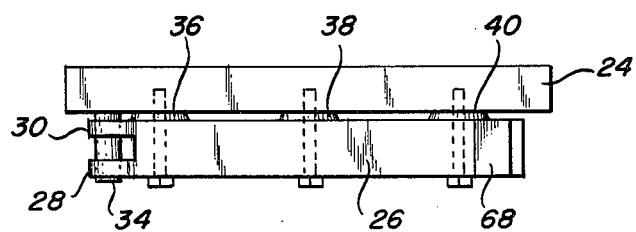

LIFTING MECHANISM FOR A PORTABLE DOCKBOARD

BACKGROUND OF THE INVENTION

Freight loading docks are usually built to a more or less standard height to cooperate with commercial trucks, trailers, and railroad freight cars. A dockboard or dockplate is used as a ramp to bridge the gap and sometimes the tolerable difference in level between the dock and vehicle bed, to facilitate the passage of handtrucks or forklift trucks that are used to load and unload freight between the dock and the beds of such different kinds of freight carrying vehicles. The ramp or bridge is usually present in the form of a dockboard or dockplate of sufficient length and width to first bridge the gap between the edge of the dock and the vehicle bed and secondly to provide a dockboard with a convenient slope for a loading truck to move up and down when the respective levels of the dock and the vehicle bed are not substantially coplanar. Sometimes permanent dockboards are hinged to the dock and the free edge is raised and lowered by power driven means to meet a truck bed. Such permanent installations are very expensive and, of course, serve only one doorway.

More frequently for warehousing and conventional freight loading uses, portable dockboards are needed that can be moved, for example, either to meet incoming trucks or from one location to another on the loading dock as various shipments are handled through various doorways or to and from various warehouse zones. Simple dockplates are sometimes used to serve as such portable bridge means but in order to produce larger portable and relatively lighter weight structures that are adapted to accommodate heavier loads and to provide safer ramps, the preferred dockboard is provided with a beam like configuration and for this purpose has side rails integral with the edges of the generally flat bridge element. These side rails, which function as stiffening means for the flat surface, may vary in height from 2½ inches to as high as 4 inches or more depending upon the load for which the ramp is designed.

The smaller dockboards and by far the majority of those boards on the docks today are designed to be manually dragged or carried from one location to another. Much less frequently, portable dockboards are provided with means for the attachment of a chain to the board in such a manner that the chain is used as a sling to hang on the forks of a forktruck so that the dockboard can be carried on the forktruck from place to place. However, the attachment of a chain to the board presents problems and labor is required to secure the chain and assist in placing the chain loop on the forks of a forktruck. When the board is lifted by the forks, there is more or less tilting of the dockboard that may cause some inconvenience during the move and ultimate placement of the dockboard after it has been moved into place. When the dockboard has been transported to a new location and is in place, the chains must be unhooked and stored out of the way before the ramp can be used.

Another procedure that has sometimes been used in the past to mount the dockboard on a forklift truck to be transported, involves raising a corner or edge of the board either manually or with a crowbar, high enough to permit the forks of a forktruck to be driven under the raised edge. This requires the presence of a strong laborer to perform the heavy lifting effort with obvious limitations of the weight that can be raised when a manual effort is used. When crowbars are provided, a manual effort must be exerted with the exercise of some skill to raise a corner. Not infrequently, the crowbars disappear or are not readily available at the site where they are needed and time is lost while the tools are procured.

Attempts have been made to partially mechanize the movement of ramps as shown in the U.S. Pat. Nos. to Whiteman, 2,597,213, May 20, 1952 and to Ambli, 3,122,764, Mar. 3, 1964.

It is to be noted that Ambli is an example of the permanently attached type of ramp that is operatively mounted at a single loading station and his bridge element is not adapted to be transported from place to place.

The Whiteman patent discloses a portable dockboard, or as he calls it, gangplank, for a loading dock. This prior art invention makes use of two wheels adapted to turn the ramp into a trundle so that an operator may balance the board on the axle between the wheels disposed on the opposite sides of the board and manually roll the board from place to place on the dock. This manually manipulated board must necessarily be a relatively lightweight construction when compared with a dockboard designed to be transported on a forklift truck. The axle of the manually transportable Whiteman trundle is made in the form of a shaft passing under a hump at its middle section. The shaft includes bracket arms for the wheels. The bracket arms are integral with the axle for simultaneous movement upon operation of a handle means. The wheel mounting arrangement is designed to have the board balanced on the wheels to permit the board to be rolled from place to place and the entire dead weight of the board must be elevated and balanced during such movement. Because of the presence of the hump formed at the midpoint along the length of the board movement of handtrucks particularly, and even forktrucks to some extent over the hump during loading and unloading, is rendered more difficult. Either because of the difficulty involved in trundling the Whiteman dockboard from place to place or because of the hump construction, insofar as is known to the present applicant, the Whiteman structure has not found favor in industrial uses.

BRIEF DESCRIPTION

The dockboard corner raising structure of this invention provides a leverage mechanism permanently positioned at the corner of a heavy dockboard that is to be raised. This structure makes it possible, whenever desired, to easily raise a corner of the board sufficiently high such that a fork means of a conventional forkloading truck can be inserted under the plate. The lifting linkage shown herein, mounted adjacent a corner and along the side of a dockboard provides an elongated handle in the form of a long lever to permit the weight that must be raised to be lifted easily with a manual effort, sufficiently high to permit the insertion under the board of the forks of the forktruck. If it should ever be desired to lift the two corners resting on the dock, another similar linkage system installed on the other side of the board can be provided, thus obviating the necessity for having a hump in the board to lift both sides simultaneously as in the prior art.

The leverage system includes a handle of sufficient length pivoted to a side wall support that is designed to render the linkage operable with a light lifting effort. The handle is normally stowed flat against the side of the board in an out of the way position and needs to be operated only when the corner of the board is to be raised.

The linkage system is operative to oscillate a roller or wheel bracket about a pivot supported integral with the side wall, to move the roller from an inactive stored position above the surface of the loading dock to an active position under the corner of the dockboard and in engagement with the dock surface for raising the corner of the dockboard and holding it raised. The linkage includes a toggle feature such that when the handle has been rotated around its pivotal mounting about 145°, the wheel bracket breaks over center as it moves to its ultimate active position and no further effort is required to hold the corner in its raised position.

A spring means is incorporated in the linkage that becomes fully tensioned as the roller bracket breaks over center, but the spring does not have sufficient strength to lift the weight of the plate on the roller bracket to return the linkage to its starting position. However, when the forks of the forklift are moved into position under the plate and the forktruck is operated to raise the board so that the weight of the board is no longer on the roller bracket, and as the dockboard is raised high enough to allow the roller bracket to freely oscillate on its pivot, the spring is active to return the bracket from its active position to its inactive position. The spring thus drives the linkage system, including the handle, to automatically cause the linkage system to return the roller bracket and handle to their out of the way inactive positions.

IN THE DRAWINGS

FIG. 5 is a top plan view of the roller bracket that is designed to be pivotally supported on a means integral with the side wall at a corner of the dockboard as well as associated elements;

FIG. 6 is top plan view, partly broken away, of the lever that serves as the handle, showing the end of the lever for operating the linkage system;

FIG. 7 is a side elevation of the lever (handle) of FIG. 6; and

FIG. 8 is a detail top plan view of the mounting plate and mounting bracket for the linkage system.

DETAILED DESCRIPTION

A modern dockboard designed to sustain loads of 15,000 lbs. and weighing 645 lbs. provides an example of the type of structure for which this invention is ideally suited. Such a dockboard has integral side rails and to be universally useful on the dock, must be portable. The board is required to be moved from one doorway to another as the delivery trucks or other vehicles are placed against the dock to be unloaded or in other instances, the boards are moved from one storage area to another area to load vehicles brought to the desired warehouse area of the dock. The preferred form of this invention will be described as mounted on the corner of a heavy duty dockboard having side rails, although it will be apparent that it could as well be integrally attached to the side edges of dockplates having no side walls, or the linkage could be adapted to dockboards designed for use between freight docks and railroad cars.

Figure 1:
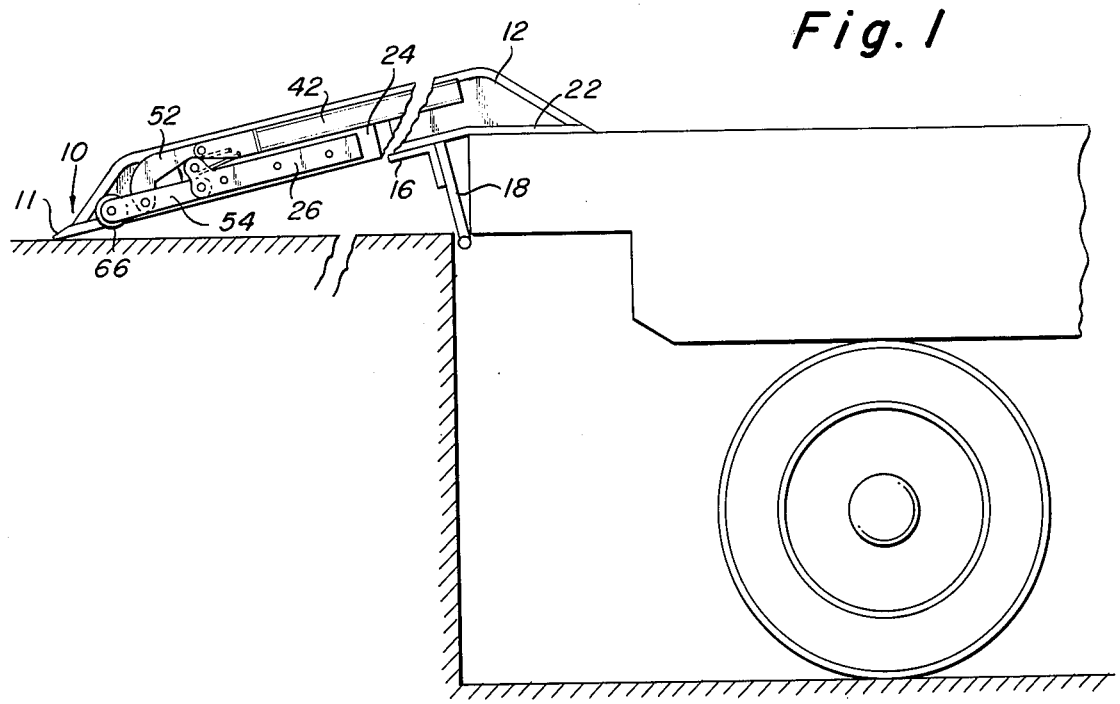
FIG. 1 is a side elevation, partly broken away, showing the dockboard in a normal position for loading or unloading a vehicle with one end of the dockboard supported on a loading dock and the other end engaged on the rear end of the bed of a truck (the linkage is shown stowed in an inactive position beside the side wall at a corner of the dockboard)

Referring to the preferred form shown in FIG. 1 of the drawings, the dockboard is shown to have a generally rectangular substantially planar load bearing surface 10 carried on the dock at one end and on the bed of a vehicle backed up to the dock on its other end. The surface 10 being preferably formed on a steel plate 11 having beveled edges on both ends. The planar surface 10 of the dockboard may be roughened to provide tread means for traction purposes. Side rails (walls) 12 are made integral with the plate 11, the rails, as is well known, being designed to cooperate with the plate 11 to form a beam member, the rails 12 serving to stiffen the plate for greater load bearing capacity and incidentally serve as safety side walls.

On its under side near the end to be laid on the bed of the truck or other vehicle, the plate 11 has angle iron 16 welded thereto crosswise with respect to the dockboard, i.e. at a right angle with respect to a rail 12, to support widely spaced apart safety flanges 18. These flanges are normally dropped into the gap between the edge of the dock and the bed of a truck backed up to the dock, as is well known, to prevent the board from being pushed off of the rear end of the bed as loading progresses, but also the flanges serve as legs to support the truck end of the board somewhat off of the dock surface when the board is set aside and is not in use.

In the known dockboard designs, the lip end 22 of the dockboard that lays on the truck bed is preferably bent about an axis disposed at a right angle to a side rail 12 about 9 inches from the end of the plate 11 and just in front of the angle iron 16. The lip of the plate 11 is bent downwardly about 10° to make that end lie flat on a truck bed that is higher than the dock surface. This lip design will also accommodate truck bed heights 1½ inches lower than the dock, with the dockboard resting on the dock. The term "substantially planar" as used above is meant to include the about 10° bend described above.

As above stated, a steel dockboard constructed as above described adapted to support a load of 15,000 lbs. and having a ramp surface 60 inches wide and 60 inches long, weighs about 645 lbs. The manual lifting force required to raise just one corner has been found to be some 214 lbs. This is much to heavy a load for most laborers and the present invention provides a mechanical assist to make this operation easy for the man or woman working as a dockhand.

Figure 2:
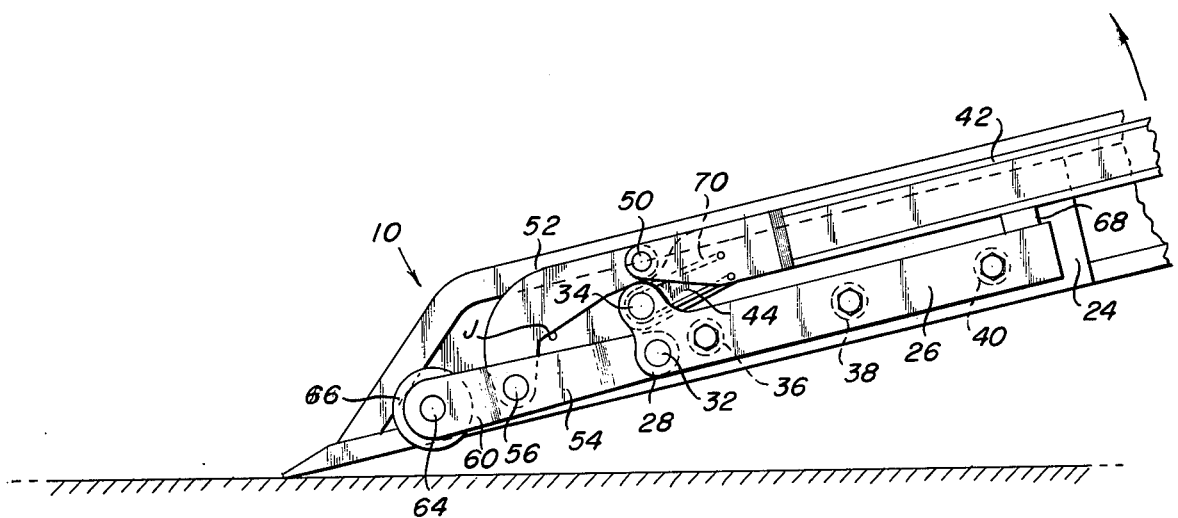
FIG. 2 is a detail of the leverage system for lifting a corner of the dockboard, showing the linkage in its stowed position.

The manual raising of the corner of such a dockboard is accomplished with a linkage system that is seen in FIGS. 1 and 2 and is supported on a mounting plate 24 adapted to be welded to the outside of the side rail 12 near one corner of the dockboard. The plate 24 has a mounting bracket 26 bolted in place, as shown in FIG. 8, the mounting bracket having a bifurcated end with arms 28 and 30 to support two fixed pivot bearings 32 and 34. The mounting bracket has bearing pads 36, 38 and 40 cast along its length through which suitable bolt holes are drilled through which the bolts may be inserted to hold this bracket fixed against the plate but spaced outwardly the thickness of pads 36, 38 and 40 from the mounting plate.

An elongated lever or handle 42 (FIGS. 1–4) is adapted to be pivotally supported on pivot bearing 34 and for this purpose at one end, as shown in FIGS. 6 and 7, the arm has an integral bearing tongue 44 having an aperture 45 therein for mounting on the pivot bearing 34. The handle also has a bifurcated bearing support at said one end spaced somewhat from tongue 44. This bifurcated end includes arms 46 and 48 having bearing apertures 49 drilled therein to support a pivot bearing 50 (see FIG. 2).

The lever handle 42 and pivot bearing 50 supported at the pivotally mounted end of the handle in turn cooperates with a bearing aperture provided at one end of the generally L-shaped toggle arm 52, shown in FIG. 2, the other end of the toggle arm 52 having a bearing aperture for pivotal connection to bearing 56 located about midway along the length of and carried by a roller bracket 54. One end of the roller bracket shown in FIG. 5 has an aperture 55 that forms a pivotal bearing that is supported on the pivot bearing 32 carried in a relatively fixed position with respect to the side rail 12 in the bifurcated arms 28 and 30 of the mounting bracket 26. The bearing 56 located midway along the length of the roller bracket extends across the rectangular aperture 58, the walls of which carry the pivot bearing 56 for connecting the toggle arm to the roller bracket. The free end of the roller bracket 54 that is driven to oscillate about the fixed bearing 32 by the movement of the toggle arm is bifuracted to have arms 60 and 62 that have apertures therein for carrying the axle 64 for a wheel 66.

When the handle 42 is mounted on the fixed bearing 34 and the linkage is assembled as described, handle 42, as shown in FIGS. 1 and 2, will normally be held flat against the rubber bumper 68 carried on the upper surface of mounting bracket 26 by means of a coil spring 70. The spring has several coils centered on and supported around bearing 34 and one end of the coil is connected to suitable stop means on the handle while the other end is connected to similar stop means on the mounting plate 24 welded to the side rail 12. For this purpose, the bearing 34 is made to extend inwardly beyond the bifurcated arm 30 of the mounting bracket 26, as shown in FIG. 8, to provide a support for the coil of the spring as it is wound up with its two arms extending from the bearing support.

In its inactive position, the handle 42 is laid in a position on the outside of side rail 12 to be generally parallel with the surface 10; thus it is positioned out of the way of traffic moving across the dockboard, the handle being stowed on the outside of the side rail 12. As long as the handle remains in this position, the roller 66 on the free end of the roller bracket is held by the action of spring 70 on the linkage, to be raised above the bottom of the underside of the plate 11 so that all parts of the linkage are stowed along the outside of the side rail with handle 42 pressed against stop 68 to be maintained in an inactive and out of the way position.

Figure 3:
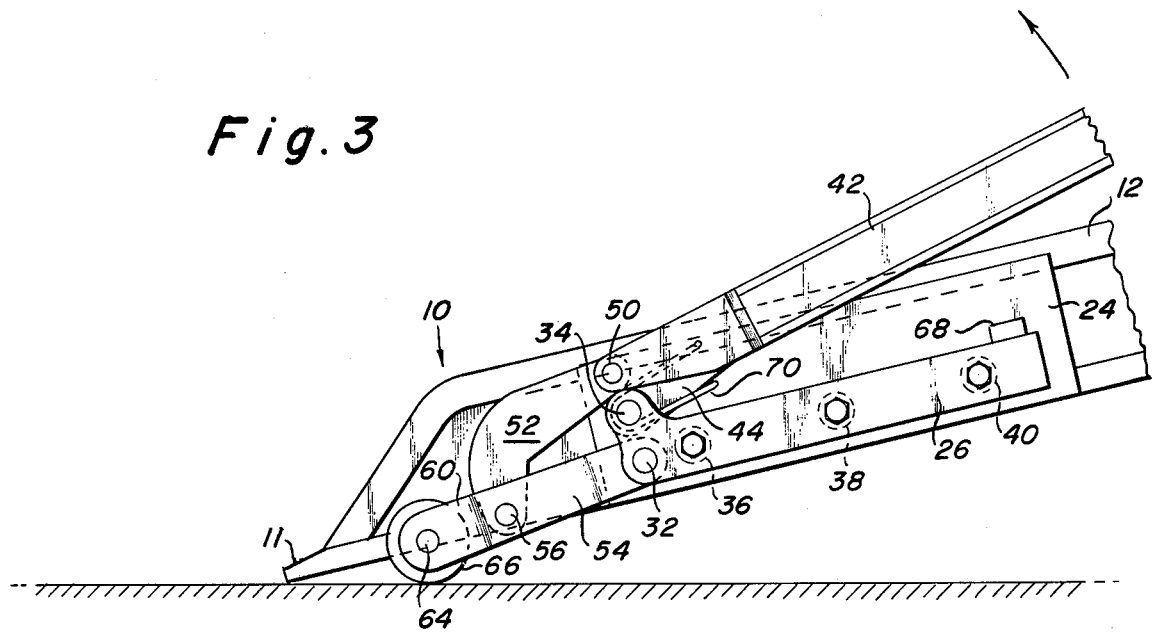
FIG. 3 is a detail side elevation of the linkage as the handle begins to move as it is lifted.
Figure 4:
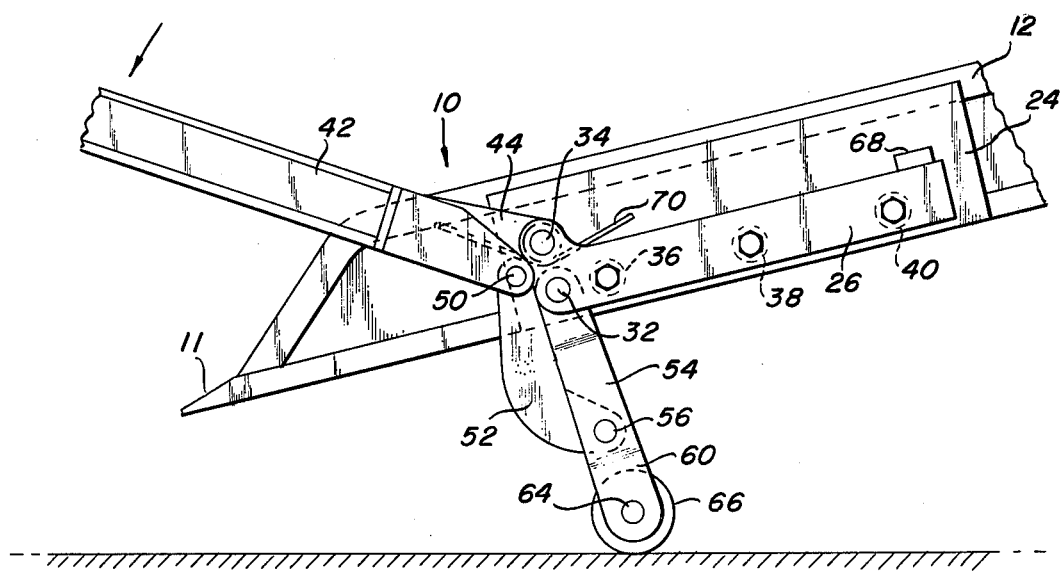
FIG. 4 is a detail side elevation of the linkage as the dockboard's corner is held raised to permit the forks of a forktruck to be pushed under the dockboard.

In order to raise one corner of the heavy steel dockboard described above, so that the fork of a forktruck can be pushed under it, the handle 42 of the toggle is raised from the position shown in FIGS. 1 and 2 and turned about bearing 34 to move through the position shown in FIG. 3, and on to complete a movement through an arc of approximately 145° to reach the position shown in FIG. 4. As the arm moves around the fixed pivot bearing 34, the bearing 50 carried in the arms 46 and 48 of the bifurcated end of the handle, swings in an arc to drive the toggle arm 52 initially to the left of the position shown in FIG. 2. The motion of toggle arm 52 drives bearing 56 carried integral with the roller bracket 54 to cause the bracket to oscillate around fixed bearing 32 carried in the arms 28 and 30 of the stationary mounting bracket 26. As the roller bracket 54 is driven from its inactive position, the roller 66 moves downwardly in an arcuate path around bearing 32 until, at the position shown in FIG. 3, it engages the surface of the dock and as the roller bracket 54 is oscillated still further around bearing 32, the roller is driven to the position shown in FIG. 4, with the roller 66 under the dockboard. The roller bracket 54 is oscillated downwardly by raising handle 42 and the roller bracket and roller 66 in effect become a lifting leg to raise that corner of the dockboard adjacent to which the mounting plate 24 is welded.

When the axis of the roller and the longitudinal axis of the roller bracket 54 are aligned vertically under the axis of bearing 32, the corner of the plate will be raised to its highest point above the surface of the dock and as the rotation of the handle 42 is continued, the roller 66 and the longitudinal axis of the lifting leg or roller bracket 54 passed beyond the vertical line. The weight of the raised corner of the dockboard then bears downwardly on the roller 66 that has passed over the center point and tends to drive the roller bracket 54 to continue to oscillate about bearing 32 until point J, see FIG. 2, on the toggle arm 52, see FIG. 2, engages against the roller bracket 54, near one end of aperture 58 in the roller bracket 54. When the toggle arm and roller bracket meet, the motion of the linkage is positively stopped and the corner is supported in its raised position with roller 66 in its over the center position. Normally, with a dockboard of the dimensions described above, the roller bracket 54 would be designed to have a length to form a lifting leg adapted to hold the corner raised about 2½ to 3 inches above the dock so that the forks of the forktruck could be pushed into place under the dockboard.

As long as the weight of the raised corner bears down on the roller 66 that has passed to the over-the-center position and point J is in contact with the roller bracket, the roller 66 cannot return to its inactive position until a positive action is taken to either manually return the handle to its starting or inactive position or the board is lifted to be transported to a new location.

After the one corner has been lifted and is being held in a raised position on the roller 66, a forktruck can be driven into position with its forks under the dockboard. Then, when the forks of the forktruck are raised to pick the board up for transport to another location, the spring 70 that was tensioned as the handle was turned to raise the corner, causes the linkage to move to its fully retracted or inactive position. The spring drives handle 42 to its seat on the bumper 68 and roller 66 is swung to its inactive position above the floor of the ramp. The spring is normally tensioned somewhat to hold the handle 42 gently seated on the bumper 68 when the handle is in its inactive position to hold it ready for use when the corner must be raised for the next move.

After the board has been moved to its new position, the forks of the forktruck are lowered and one end of the dockboard is lowered onto the floor so that the forktruck can be reversed to pull the forks from under the other end of the board to deposit the board on the dock. The corner that had been raised will now lie flat on the dock since the spring 70 has automatically returned roller 66 and handle 42 to their inactive positions.

The above example illustrates the preferred form of the invention as adapted to a conventional steel, heavy duty type of dockboard having integral rails. The linkage system described and carried on mounting board 24 could easily be welded to the side edge of a flat steel dockplate and likewise the linkage could be designed to be installed on the much heavier dockboards used for loading and unloading railroad cars. The use of the term dockboard in the claims is intended to include all of these equivalent structures within the scope of the invention described.

Normally, a lifting linkage disposed on one corner of a dockboard will be sufficient to raise one end of the board so that the forks of a forklift can be inserted under the dockboard. In some circumstances, however, it may be desirable to mount a linkage on both of the two corners on the dockside end of the dockboard.

Because of the problems arising from the necessity of moving dockboards, the present-day boards are usually made of aluminum, which can be easily handled manually. Steel is much more durable, providing longer life, and can be easily repaired by welding as compared with repairing an aluminum board. Despite the advantages of steel, aluminum boards now predominate on the docks, and this invention may well find use on many of the larger-sized aluminum dockboards. However, with the invention disclosed herein, the use of steel boards could well increase and the more widespread use of heavier steel boards can be anticipated. On the usual high volume freight loading docks and in normal warehousing operations, forktrucks are always available for use on the dock. When the installation of the lifting mechanism of this invention, any size of steel dockboard can be equipped with a corner raising linkage system so that any laborer can manually operate the linkage to raise a corner or corners of a dockboard for preparing the board to receive a forktruck; weight is no problem.

The linkage system is normally arranged along the side edge of the dockboard in a compact folded position so that it does not interfere in any way with the normal use of the dockboard. When a corner must be raised, a simple oscillation of the handle moves the roller bracket into the over the center position to hold the corner of the board raised without further attention from the operator. As the board is being lifted with the aid of a forktruck, the linkage is automatically returned to its folded inactive position.

As above stated, a preferred form of the invention has been illustrated herein. It is possible that many modifications thereof may occur to those skilled in the art that will fall within the scope of the following claims.

What is claimed is:

1. A lifting mechanism for raising and temporarily supporting a heavy rectangular portable dockboard structure or the like to enable the forks of a lifting truck to move under the dockboard, said dockboard including a rectangular substantially planar plate means having a surface for bridging the gap between the edge of a horizontal floor of a loading dock and the bed of a vehicle, comprising
    a. means mounted adjacent at least one corner of said dockboard, said means including
        (i) first pivot bearing means integral with said dockboard, and
        (ii) a bracket movable between an inactive position above said floor and an active position below said plate, said movable bracket being supported on said first pivot bearing means at a pivot connection to be moved from one of said positions to the other, said bracket being adapted in said active position to hold said at least one corner in a raised position;
    b. means to move said bracket from said inactive position to said active position including toggle means to provide movement of said bracket to an over-the-center locked position;
    c. means to return said bracket to said inactive position.

2. A structure as in claim 1 wherein said bracket is made in the form of an elongated bar, said pivot connection between the bracket and said first pivot bearing means being at one end of said bracket, the opposite end of the bracket serving as the foot element of a lifting leg, and a roller means carried in bearings at said foot element end of the bracket.

3. A structure as in claim 1 wherein said means to return said bracket to said inactive position includes a spring means adapted to automatically return said bracket to its inactive position when said dockboard is lifted to be transported.

4. A structure as in claim 1 wherein said means to return said bracket to said inactive position includes a spring means that is active to return said bracket to its inactive position when said dockboard is lifted by said truck high enough to permit said bracket to move freely from its over-the-center position.

5. A lifting mechanism for raising and temporarily supporting a heavy rectangular portable dockboard structure or the like to enable the forks of a lifting truck to move under the dockboard, said dockboard including a rectangular substantially planar plate means having a surface for bridging the gap between the edge of a horizontal floor of a loading dock and the bed of a vehicle, said plate means also having integral side rails extending above its surface, comprising
    a. means mounted adjacent at least one corner of said dockboard, said means including
        (i) first pivot bearing means integral with said dockboard,
        (ii) an elongated bracket movable between an inactive position above said floor and an active position below said plate, said movable bracket being supported on said first pivot bearing means at a pivot connection to be moved from one of said positions to the other, said bracket being adapted in said active position to hold said at least one corner of said dockboard in a raised position,
        (iii) a support means to carry said first pivot bearing means on the outside of at least one of said side rails,
        (iv) a second pivot bearing means on the support means on the outside of said at least one side rail, said second pivot bearing means being spaced above said first pivot bearing means,
        (v) a third pivot bearing means centrally disposed on the elongated bracket;

b. means to move said bracket from said inactive position to said active position including
   (i) an elongated handle, said handle having two rotary bearing means integral with one end thereof, the first of said rotary bearing means of the handle being adapted to be mounted on said second pivot bearing means;
   (ii) an L-shaped arm having connecting bearing means at each end thereof, one of said connecting bearing means of the L-shaped arm being connected to the second of said rotary bearing means on the handle and said other connecting bearing means at the other end of the L-shaped arm being connected to the third pivot bearing means;

said bracket, L-shaped arm and handle together with their bearing means being so proportioned and positioned as to allow the bracket to be substantially aligned with the surface of the plate means and above the floor of the dock when said bracket is in the inactive position and so as to allow the handle to be substantially parallel to the plane of the surface of the plate means when said bracket is in the inactive position; and said pivotally joined elements including said L-shaped arm forming a system providing a leverage means rotatable around said second pivot bearing means to drive said bracket into an over-the-center active position and lock the bracket against a return to the inactive position while said at least one corner of said dockboard is supported on said bracket;

c. means to return said bracket to said inactive position.

6. A structure as in claim 5 wherein said bracket is made in the form of an elongated bar, said pivot connection between the bracket and said first bearing means being at one end of said bracket, the opposite end of the bracket serving as the foot element of a lifting leg, and a roller means carried in bearings at said foot element end of the bracket.

7. A structure as in claim 5 in which said means (c) includes a coil spring means with an arm extending away from the coil at each end thereof, said coil being centered on said second pivot bearing means, one of said arms of the spring engaging a stop integral with said at least one side rail, and the other of said arms engaging a stop integral with said handle whereby when said handle is turned, the spring becomes stressed in a manner to tend to drive the handle back to its parallel position so that when said at least one corner is lifted to relieve the load on said bracket, the bracket is returned to its inactive position.

* * * * *

UNITED STATES PATENT OFFICE
CERTIFICATE OF CORRECTION

PATENT NO. : 4,075,729
DATED : February 28, 1978
INVENTOR(S) : John R. Conner

It is certified that error appears in the above-identified patent and that said Letters Patent are hereby corrected as shown below:

Column 7, line 29, "more" should be inserted after "which can be".

Column 7, line 41, "When" should be --With--.

Column 8, line 13, "of said dockboard" should be inserted after "corner".

Column 10, line 9, "pivot" should be inserted after "first".

Column 10, line 23, "of said dockboard" should be inserted after "corner".

Signed and Sealed this

Sixth Day of June 1978

[SEAL]

Attest:

RUTH C. MASON
Attesting Officer

DONALD W. BANNER
Commissioner of Patents and Trademarks